United States Patent Office 2,905,565
Patented Sept. 22, 1959

2,905,565

AQUEOUS SLURRY OF COMMINUTED ARGILLACEOUS LIMESTONE MATERIAL AND PROCESS OF PRODUCING SAME

Karl Dietz, Kronberg, Taunus, Heinrich Greüne, Frankfurt am Main-Hochst, and Rudolf Stroh, Kronberg, Taunus, Germany, assignors to Farbwerke Hoechst Aktiengesellschaft vormals Meister Lucius & Bruning, Frankfurt am Main-Hochst, Germany, a company of Germany No Drawing. Application November 17, 1953
Serial No. 392,742

Claims priority, application Germany November 21, 1952

14 Claims. (Cl. 106—100)

This invention relates to an aqueous slurry of comminuted argillaceous limestone material and to a process of producing same.

It is an object of the invention to provide a slurry which, upon burning, produces a Portland-type cement, said slurry having a good structural viscosity (non-Newtonian behaviour).

Another object is a slurry being sufficiently fluid to be pumped and containing a quantity of water otherwise insufficient for the purpose.

A further object of this invention is the provision of a process for the production of a slurry having a flow point as low as possible and possessing especially good flow properties which are maintained during storage, so that the slurry can be stored without sedimentation.

Now, we have found that it is possible to obtain an aqueous slurry of comminuted argillaceous limestone or chalk material which, upon burning, produces cement, said slurry having a good structural viscosity (non-Newtonian behaviour) and being sufficiently fluid to be pumped and containing a quantity of water otherwise insufficient for the purpose, said slurry containing a salt or salt-like compound of a polybasic organic acid. The aforementioned substances may be added to said argillaceous limestone or chalk material present in said slurry.

As such an addition there is especially suitable an alkali metal or ammonium salt of a polybasic aliphatic or aromatic acid, especially a tri- or polybasic acid. There may be mentioned, for example, the salts of the following acids: polyvinyl sulfonic acid, polyacrylic acid, naphthalene trisulfonic acid, naphthalene tetrasulfonic acid, carbazole tetrasulfonic acid, naphthol trisulfonic acid and other aromatic compounds containing a plurality of sulfonic acid or carboxylic acid groups, such as diglycolic acid or 4,4'-dihydroxy-diphenyl-methane-3,3'-dicarboxylic acid. As additions to the slurry there may also be used condensation products of 1-sulfomethyl-2-napthol-6-sulfonic acid with cresol-formaldehyde resin, or the copolymers prepared from components such as maleic acid, acrylic acid, crotonic acid or vinyl sulfonic acid.

The substances used as additions in the present invention may be added in small proportions. Generally, a proportion ranging from about 0.01 to about 0.5 per mil by weight based on the weight of the slurry is sufficient. A proportion of 0.1 to 0.3 per mil has proved to be especially advantageous. A single added substance of the above kind or a mixture of two or more such substances may be used.

In some cases it may be of advantage to use, in addition, other compounds capable of increasing the fluidity, for instance, salts of inorganic polyacids, such as the alkali metal salts of polyphosphoric acids of polysilicic acids. The alkali metal salts of tripolyphosphoric acid or tetrapolyphosphoric acid are especially suitable, for instance, sodium tripolyphosphate or sodium tetrapolyphosphate. These compounds are also added in small proportions. Proportions ranging from about 0.03 to about 0.5 per mil calculated on the weight of the slurry are sufficient, while proportions from 0.1 to 0.3 per mil have proved to be especially advantageous.

It may also be of advantage to add surface-active organic substances, for instance, water-soluble alkyl-naphthalene sulfonates or their substitution products. The proportions thereof may range from about 0.2 to about 0.1 per mil calculated on the weight of the slurry. The alkali salts, such as sodium methyl-naphthalene sulfonate, are especially suitable.

If desired, an alkali carbonate or alkali hydroxide may be added, for instance, in a proportion ranging from about 0.01 to about 0.5 per mil calculated on the weight of the slurry, in order to impart a suitable pH value to the slurry, ranging, for instance, from about 6 to about 11. The substances may be added in the form of aqueous solutions.

The added substances or mixtures thereof may be incorporated with the slurry at any desired stage of its preparation depending on the conditions of operation, for instance, during the formation of the slurry or before or during the grinding of the minerals, or after the grinding by introduction into the finished slurry or during the slurrying of individual components of the slurry.

The following examples serve to illustrate the invention, but they are not intended to limit it thereto, the parts being by weight:

*Example 1*

0.2 part of sodium polyvinyl sulfonate is incorporated with 1000 parts of a slurry suitable for cement manufacture and having a water content of 32 percent by adding the said addition immediately prior to grinding, mixing or slurrying. The viscosity of the resulting slurry, having a water content of 32 percent, corresponds to the viscosity of a slurry having a water content of 37 percent but not containing the said addition. The water content is thus reduced from 37 percent to 32 percent.

*Example 2*

1000 parts of a slurry suitable for cement manufacture and having a water content of 30 percent are mixed with 0.3 part of sodium carbazole tetrasulfonate. The viscosity of the resulting slurry corresponds to that of a slurry having a water content of 35 percent but not containing the said addition. The water content is thus reduced from 35 percent to 30 percent.

*Example 3*

1000 parts of a slurry suitable for cement manufacture and having a water content of 28 percent are mixed with 0.3 part of sodium polyphosphate and 0.1 part of sodium polyvinyl sulfonate. The viscosity of the resulting slurry corresponds to that of a slurry having a water content of 36 percent but not containing the said addition. The water content is thus reduced from 36 percent to 28 percent.

*Example 4*

1000 parts of a slurry suitable for cement manufacture and having a water content of 28 percent are mixed with 0.25 part of sodium polyphosphate, 0.05 part of ammonium methylene naphthalene sulfonate and 0.1 part of sodium naphthol trisulfonate. The viscosity of the resulting slurry corresponds to that of a slurry having a water content of 35 percent but not containing the said additions. The water content is thus reduced from 35 percent to 28 percent.

Example 5

1000 parts of a slurry suitable for cement manufacture and having a water content of 29 percent are mixed with 0.25 part of sodium polyphosphate, 0.05 part of sodium naphthol trisulfonate and 0.05 part of the sodium salt of the copolymer of maleic acid and vinyl acetate. The viscosity of the resulting slurry corresponds to that of a slurry having a water content of 34 percent, but not containing the said additions. The water content is thus reduced from 34 percent to 29 percent.

Example 6

1000 parts of a slurry suitable for cement manufacture and having a water content of 28 percent are mixed with 0.25 part of sodium polyphosphate, 0.05 part of sodium methylene naphthalene sulfonate, 0.1 part of the condensation product of 1-sulfomethyl-2-naphthol-6-sulfonic acid and cresol-formaldehyde resin (sodium salt). The viscosity of the resulting slurry corresponds to that of a slurry having a water content of 35 percent, but not containing the said additions. The water content is thus reduced from 35 percent to 28 percent.

We claim:

1. A process for the production of an aqueous slurry of comminuted argillaceous limestone material which, upon burning, produces cement, said slurry being sufficiently fluid to be pumped and containing a quantity of water otherwise insufficient for the purpose, said process comprising adding to said argillaceous limestone material present in said slurry, a compound of an at least tribasic acid selected from the group consisting of salts of an acid obtained by polymerizing at least one acid containing the ethylene —CH=CH— group, of a sulfonic acid of the naphthalene series, of carbazol-tetra-sulfonic acid and salt-like compounds of these acids in an amount of at least about 0.01 per mil, calculated on the weight of the slurry.

2. A process for the production of an aqueous slurry of comminuted arigllaceous limestone material which, upon burning, produces cement, said slurry being sufficiently fluid to be pumped and containing a quantity of water otherwise insufficient for the purpose, said process comprising adding to said argillaceous limestone material present in said slurry, a compound of an at least tribasic acid selected from the group consisting of alkali-salts of an acid obtained by polymerizing at least one acid containing the ethylene —CH=CH— group, of a sulfonic acid of the naphthalene series, and of carbazol-tetra-sulfonic acid in an amount of at least about 0.01 per mil, calculated on the weight of the slurry.

3. A process for the production of an aqueous slurry of comminuted argillaceous limestone material which, upon burning, produces cement, said slurry being sufficiently fluid to be pumped and containing a quantity of water otherwise insufficient for the purpose, said process comprising adding to said argillaceous limestone material present in said slurry, a compound of an at least tribasic acid selected from the group consisting of salts of an acid obtained by polymerizing at least one acid containing the ethylene —CH=CH— group, of a sulfonic acid of the naphthalene series, of carbazoltetra-sulfonic acid and salt-like compounds of these acids in an amount of at least about 0.01 per mil and a salt of an inorganic polyacid selected from the group consisting of polyphosphoric acid and polysilicic acid in an amount of at least about 0.03 per mil, the per mil figures being calculated on the weight of said slurry.

4. A process for the production of an aqueous slurry of comminuted argillaceous limestone material which, upon burning, produces cement, said slurry being sufficiently fluid to be pumped and containing a quantity of water otherwise insufficient for the purpose, said process comprising adding to said argillaceous limestone material present in said slurry, a compound of an at least tribasic acid selected from the group consisting of salts of an acid obtained by polymerizing at least one acid containing the ethylene —CH=CH— group, of a sulfonic acid of the naphthalene series, of carbazoltetra-sulfonic acid and salt-like compounds of these acids in an amount of at least about 0.01 per mil and an organic surface-active substance in an amount of at least about 0.02 per mil, the per mil figures being calculated on the weight of said slurry.

5. A process for the production of an aqueous slurry of comminuted argillaceous limestone material which, upon burning, produces cement, said slurry being sufficiently fluid to be pumped and containing a quantity of water otherwise insufficient for the purpose, said process comprising adding to said argillaceous limestone material present in said slurry, a compound selected from the group consisting of salts and salt-like compounds of polyvinyl sulfonic acid in an amount between about 0.01 per mil and about 0.5 per mil calculated on the weight of the slurry.

6. A process for the production of an aqueous slurry of comminuted argillaceous limestone material which, upon burning, produces cement, said slurry being sufficiently fluid to be pumped and containing a quantity of water otherwise insufficient for the purpose, said process comprising adding to said argillaceous limestone material present in said slurry, a compound selected from the group consisting of salts and salt-like compounds of an at least tribasic acid obtained by polymerizing at least one acid containing the ethylene —CH=CH— group in an amount between about 0.01 per mil and about 0.5 per mil calculated on the weight of the slurry.

7. A process for the production of an aqueous slurry of comminuted argillaceous limestone material which, upon burning, produces cement, said slurry being sufficiently fluid to be pumped and containing a quantity of water otherwise insufficient for the purpose, said process comprising adding to said argillaceous limestone material present in said slurry, a compound selected from the group consisting of salts and salt-like compounds of an at least tribasic sulfonic acid of the naphthalene series in an amount between about 0.01 per mil and about 0.5 per mil calculated on the weight of the slurry.

8. Aqueous slurry of comminuted argillaceous limestone material which, upon burning, produces cement, said slurry being sufficiently fluid to be pumped, containing a quantity of water otherwise insufficient for the purpose, and containing a compound of an at least tribasic acid selected from the group consisting of salts of an acid obtained by polymerizing at least one acid containing the ethylene —CH=CH— group, of a sulfonic acid of the naphthalene series, of carbazoltetra-sulfonic acid and salt-like compounds thereof in an amount of at least about 0.01 per mil, calculated on the weight of the slurry.

9. Aqueous slurry of comminuted argillaceous limestone material which, upon burning, produces cement, said slurry being sufficiently fluid to be pumped, containing a quantity of water otherwise insufficient for the purpose, and containing a compound of an at least tribasic acid selected from the group consisting of alkali salts of an acid obtained by polymerizing at least one acid containing the ethylene —CH=CH— group, of a sulfonic acid of the naphthalene series, and of carbazoltetra-sulfonic acid in an amount of at least about 0.01 per mil, calculated on the weight of the slurry.

10. Aqueous slurry of comminuted argillaceous limestone material which, upon burning, produces cement, said slurry being sufficiently fluid to be pumped, containing a quantity of water otherwise insufficient for the purpose, and containing a compound selected from the group consisting of salts and salt-like compounds of polyvinyl sulfonic acid in an amount between about 0.01 per mil and about 0.5 per mil, calculated on the weight of the slurry.

11. Aqueous slurry of comminuted argillaceous limestone material which, upon burning, produces cement, said slurry being sufficiently fluid to be pumped, containing a quantity of water otherwise insufficient for the purpose, and containing a compound selected from the group consisting of salts and salt-like compounds of an at least tribasic acid obtained by polymerizing at least one acid containing the ethylene —CH=CH— group in an amount between about 0.01 per mil and about 0.5 per mil, calculated on the weight of the slurry.

12. Aqueous slurry of comminuted argillaceous limestone material which, upon burning, produces cement, said slurry being sufficiently fluid to be pumped, containing a quantity of water otherwise insufficient for the purpose, and containing a compound selected from the group consisting of salts and salt-like compounds of an at least tribasic sulfonic acid of the naphthalene series in an amount between about 0.01 per mil and about 0.5 per mil, calculated on the weight of the slurry.

13. A process for the production of an aqueous slurry of comminuted raw cement which, upon burning, produces a Portland-type cement, said slurry being sufficiently fluid to be pumped and containing a quantity of water otherwise insufficient for the purpose, said process comprising adding to said raw cement present in said slurry, a compound of an at least tribasic acid selected from the group consisting of salts of an acid obtained by polymerizing at least one acid containing the ethylene —CH=CH— group, of a sulfonic acid of the naphthalene series, of carbazol-tetra-sulfonic acid and salt-like compounds of these acids in an amount of at least about 0.01 per mil, calculated on the weight of the slurry.

14. Aqueous slurry of comminuted raw cement which, upon burning, produces a Portland-type cement, said slurry being sufficiently fluid to be pumped, containing a quantity of water otherwise insufficient for the purpose, and containing a compound of an at least tribasic acid selected from the group consisting of salts of an acid obtained by polymerizing at least one acid containing the ethylene —CH=CH— group, of a sulfonic acid of the naphthalene series, of carbazoltetra-sulfonic acid and salt-like compounds thereof in an amount of at least about 0.01 per mil, calculated on the weight of the slurry.

References Cited in the file of this patent

UNITED STATES PATENTS

| | | |
|---|---|---|
| 2,174,051 | Winkler | Sept. 26, 1939 |
| 2,390,225 | Sherman et al. | Dec. 4, 1945 |
| 2,587,044 | Heilmann | Feb. 26, 1952 |
| 2,690,975 | Scripture | Oct. 5, 1954 |
| 2,709,661 | Dietz | May 31, 1955 |

FOREIGN PATENTS

| | | |
|---|---|---|
| 15,249 | Australia | Nov. 21, 1933 |